(12) United States Patent
Klahn

(10) Patent No.: US 6,966,766 B2
(45) Date of Patent: Nov. 22, 2005

(54) METHOD AND APPARATUS FOR PRODUCING A SHELL OF A MASS CONTAINING FAT AND/OR SUGAR IN A MOULD

(75) Inventor: Uwe Klahn, Bad Salzuflen (DE)

(73) Assignee: Sollich KG, Salzuflen (DE)

( * ) Notice: Subject to any disclaimer, the term of this patent is extended or adjusted under 35 U.S.C. 154(b) by 456 days.

(21) Appl. No.: 10/243,598

(22) Filed: Sep. 13, 2002

(65) Prior Publication Data

US 2003/0059510 A1  Mar. 27, 2003

(30) Foreign Application Priority Data

Sep. 25, 2001 (DE) ................. 101 47 177

(51) Int. Cl.⁷ ............................. A23G 1/21; A23G 3/02
(52) U.S. Cl. ................ 425/425; 425/431; 425/DIG. 44
(58) Field of Search ................. 425/425, 431, 425/DIG. 44; 264/313

(56) References Cited

U.S. PATENT DOCUMENTS 5,306,460 A * 4/1994 Hidawa et al. ............. 264/313
6,242,028 B1   6/2001 Bean .......................... 426/515

FOREIGN PATENT DOCUMENTS

| CA | 2063042 | 9/1995 |
|----|---------|--------|
| DE | 1 955 056 | 5/1971 |
| DE | 198 52 262 C2 | 8/2001 |
| EP | 958298 | 5/1964 |
| EP | 0 318 595 | 6/1989 |
| EP | 0 566 927 A2 | 10/1993 |
| EP | 0 581 243 A1 | 2/1994 |
| EP | 0 589 820 A1 | 3/1994 |
| EP | 0 680 701 A1 | 11/1995 |
| GB | 207974 | 12/1923 |

* cited by examiner

Primary Examiner—James P. Mackey
(74) Attorney, Agent, or Firm—Thomas, Kayden, Horstemeyer & Risley, LLP

(57) ABSTRACT

A method of producing a shell of an edible mass includes the steps of filling the fluidized mass into a mould, the mould at least being partly made of an elastic and resilient material, and dislocating the mass contained in the mould without directly contacting the mass until the mass has at least partly solidified to form a shell. An apparatus for producing a shell of an edible mass includes at least one mould at least being partly made of an elastic and resilient material. The mould includes an inner side and an outer side. The inner side is designed and arranged to be contacted by the mass when the mass has been filled into the mould. At least one dislocating element is designed and arranged to contact the outer side without directly contacting the mass. The dislocating element is designed and arranged to temporarily deforem the mould in an elastic way.

16 Claims, 2 Drawing Sheets

METHOD AND APPARATUS FOR PRODUCING A SHELL OF A MASS CONTAINING FAT AND/OR SUGAR IN A MOULD

CROSS REFERENCE TO RELATED APPLICATIONS

This application claims priority to co-pending German Patent Application No. 101 47 177.7-23 entitled "Verfahren und Vorrichtung zum Herstellen einer Schale aus fett- und/oder zuckerhaltiger Masse in einer Form," filed Sep. 25, 2002.

FIELD OF THE INVENTION

The present invention generally relates to a method of producing an edible shell made of a mass containing fat and/or sugar in a mould. The fluidized mass is filled into the mould in a way as it corresponds to the amount of the mass being necessary for producing the shell. The mass is dislocated or moved along the wall of the mould. The mass hardens or solidifies to form the shell. Finally, the solid shell is removed from the mould. It may be filled with another mass, it may be covered, coated or otherwise processed, and it may be packed.

BACKGROUND OF THE INVENTION

A method and an apparatus for producing a shell of an edible mass are known from British Patent No. 207 974. The mass in its fluidized condition is filled into the mould being opened in an upward direction. The mould includes a stiff, undeformable body especially being made of metal. The mould is partially filled with such an amount of the mass as it is determined for the production of the shell. A dislocating element is lowered onto the fluidized mass from above such that the mass fills the intermediate space between the dislocating element and the mould being opened towards an upward direction to the rim. The dislocating element is designed as a stamp element, and it is connected to a cooling circuit to cool the mass in this way and to solidify the mass. It is a problem that the mass in its fluidized condition directly contacts the dislocating element until the shell hardens. To remove the stamp-like dislocating element from the solid shell, the stamp-like dislocating element is provided with a lubricant which may be a fluid or a solvent. Alcohol, terpine, edible parafines, water and gelantine are mentioned as such separating agents. These separating agents are used in the region of the stamp element. The mould is not being cooled, and it is not treated with a separating agent.

European Patent Application No. 0 589 820 A1 shows a method of producing shell-like hollow bodies being made of chocolate or another mass containing fat. The mass in its fluidized condition is poured into a stiff mould. Preferably, the mould is made of hard polycarbonate. A stamp element being movable in an upward direction and in a downward direction and being directed to a cooling circuit is lowered to contact the fluidized mass being contained in the mass. The stamp element has a temperature of less than 0° C. (32° F.) and it remains in the mass dislocated by the stamp element for a certain period of time, mostly between 1 and 10 seconds. The temperature of the mould preferably is less than the temperature of the mass. Chocolate masses and other masses containing fat which contract during solidification may be comparatively easily removed from a mould. This is achieved by turning the mould, and by knocking out the shells. With this known method, shells of vary uniform wall thickness may be produced. The shells may be easily removed from the strongly cooled stamp element.

German Patent No. 198 52 262 C2 teaches a stamp unit for imprinting shells with opened hollow moulds to be filled with liquid chocolate mass. The stamp element is lowered from above to directly contact the liquid chocolate mass. The stamp element is being cooled. The stamp element has a core of copper and a cover of aluminum to have a positive effect on heat conductivity.

From Canadian Patent No. 2,063,042, it is known to pour liquid chocolate mass into an elastic membrane-like mould, and to let the mass solidify in the mould. In this way, bodies made of chocolate may be produced, the bodies including undercuts. For removal of the bodies, the elastic mould is expanded by use of vacuum such that the solid body of chocolate falls out of the mould. It is also possible to use stamp-like ejecting elements to contact and deform the mould during ejection of the solid chocolate articles such that the solid chocolate bodies are released. However, it is not possible to produce shell-like hollow bodies in this way.

SUMMARY OF THE INVENTION

The present invention relates to a method and an apparatus for producing a shell of an edible mass.

The method includes the steps of filling the fluidized mass into a mould, the mould at least being partly made of an elastic and resilient material, and dislocating the mass contained in the mould without directly contacting the mass until the mass has at least partly solidified to form a shell.

The apparatus includes at least one mould at least being partly made of an elastic and resilient material. The mould includes an inner side and an outer side. The inner side is designed and arranged to be contacted by the mass when the mass has been filled into the mould. At least one dislocating element is designed and arranged to contact the outer side without directly contacting the mass. The dislocating element is designed and arranged to temporarily deform the mould in an elastic way.

The present invention also relates to a method of producing a shell of an edible mass including the steps of filling the fluidized mass into a mould, the mould at least being partly made of an elastic and resilient material, elastically deforming the mould and the mass contained therein with a dislocating element contacting the mould at its side facing away from the mass and deforming the mould in an upward direction until the fluidized mass has reached a predetermined position and until the mass has at least partly solidified at the predetermined position, the mass being dislocated in the mould without being contacted by the dislocating element, removing the dislocating element from contact to the mould such that the mould reaches its initial position due to its resilient properties and such that the shell attains its predetermined shape, and removing the shell from the mould when the mass has solidified.

The present invention also relates to an apparatus including at least one mould being designed and arranged to be at least partly filled with the fluidized edible mass, the mould including an inner side and an outer side, the inner side being designed and arranged to be contacted by the mass when the mass has been filled into the mould, the mould at least being partly made of an elastic and resilient material. At least one dislocating element is designed and arranged to contact the outer side without directly contacting the mass, the dislocating element being designed and arranged to temporarily and elastically deform the mould in an upward direction until the fluidized mass has reached a predetermined position and until the mass has at least partly solidified at the predetermined position, the mass being dislocated in the mould without being directly contacted by the dislocating element, the dislocating element being designed and arranged to be removed from contact to the mould such that the mould reaches its initial position due to its resilient properties and such that the shell attains its predetermined hollow shape.

The term "fluidized mass" or "mass in its fluidized condition" is to be understood herein in a broad sense. Such a fluidized mass is to be understood to include all semi-fluid, fluid, pasty, mushy or similar masses which—usually under the influence of heat—are introduced into a mould, and which—usually due to cooling—later form a solid, shell-like hollow body in the mould. For example, such masses may be chocolate masses, caramel masses, fondant masses, fruit masses, jelly masses, nougat masses and the like. It is also possible to use masses containing sugar, for example candy masses. In most cases, the solid shell is not the finished product. Usually, it will be filled with one or more additional masses, it will be covered, or it will be processed in other ways to produce an edible product of the food and candy industry.

With the novel method and apparatus, it is possible to produce shell-like hollow bodies being made of a mass containing fat and/or sugar in which the problem of the mass and the shell, respectively, sticking to a dislocating element, and the problem of removing the shell from a dislocating element has been solved, and with which the solid shell may be removed from the mould even in the case of masses which are difficult to be handled.

The present invention uses the novel concept of dislocating the mass contained in the mould from below instead of from above as it is known in the prior art. For this purpose, a mould is used which, on the one hand, is designed to be opened in an upward direction to be capable of pouring the fluidized mass into the mould from above. The mould is not made of hard, undeformable plastic, but instead of an elastic material. For example, the mould may be designed to have comparatively thin walls and a design similar to a membrane. The mould may be deformed by a dislocating element being moved from below in an upward direction. The dislocating element contacts the mould at the side facing away from the mass such that the fluidized mass is lifted in the mould until it features the rim of the shell to be formed. The mould is at least partly reversed in an upward direction without the mass being removed from the mould. The shell is produced by controlled lowering of the dislocating element under simultaneous solidifying of the mass along the wall of the mould. The material of the mould has to have certain resilient properties to ensure that it reaches its initial position during the backstroke of the dislocating element and to let the still fluidized portion of the mass enter the bottom region of the mould such that this mass may solidify at this place. Especially, the mould may be made of a silicone material, or at least portions thereof may be made of silicone. The mould has a cup-like, especially semi-circular design. The wall thickness may be especially in a range of approximately 1 to 2 mm. The mould may also have a truncated cone design, or even a square or a rectangular cross section, preferably including rounded corners.

The dislocating element may be any element with which the elastic mould may be deformed in an upward direction. The dislocating element in its simplest embodiment may be mechanically designed as a stamp element having a rounded upper surface. The temperatures of the components have to be taken into account. The mass in its fluidized condition will be filled into the mould at a respective temperature. The mass will be uniformly distributed in the mould to form a horizontal liquid level. The dislocating element is moved centrically with respect to the axis of the mould in a forward stroke from below towards an upward direction, the fluidized mass further being distributed and lifted in the mould such that it reaches the predetermined rim portion in the mould. At this place, the solidifying process of the mould is initiated. This solidifying process may be further accelerated by additionally cooling the mould. This condition may be maintained for a plurality of seconds until solidification of the shell occurs in the rim portion. The dislocating element is moved in a downward direction determined with respect to time and coordinated with the kind and the solidifying properties of the mass. The solid shell forms starting at the rim portion and continuing in a downward direction. Finally, the mould due to its resilient properties regains its initial position. Afterwards, the shell also hardens in the bottom portion. It is desired to attain approximately uniform wall thickness of the shell with this backstroke. However, it is also possible to produce the shell to have a greater amount of mass in the bottom portion.

It is an important advantage of the novel method that only the mould contacts the mass. Consequently, there are no problems of the mass sticking to a dislocating element and of removing the mass from the dislocating element since the mass is deformed only contacting the mould. The novel method allows for a great fill factor, meaning shells having comparatively thin walls and respective volumes may be produced. A fill factor of approximately up to 60 percent may be reached. Such a shell makes it possible to locate a substantial amount of a different mass or of different masses in the shell. It may make sense to cool the mould in some way to accelerate or to control the hardening process of the mass. It is not necessary to cool the dislocating element. There also are no problems related to special designs of the dislocating element as they are known from the prior art. In the novel method, the dislocating element always remains clean since it does not contact the mass. The wall thickness of the shell may be controlled by choosing the amount of the mass being introduced into the mould and by choosing the period of time during which the stamp element is located in its upward position. In this way, it is possible to produce shells of different wall thicknesses in one mould. The novel method also allows for short process times, meaning a substantial amount of shells may be produced. Using a mould of an elastic, resilient material, as for example silicone, also provides for the advantage or being capable of removing the solid shell from the mould in a simple way. Removing may be realized in an upward direction or in a downward direction after turning the mould. It is also possible to at least partly use a reversing process of the mould in addition. In such a case, the mould being made of an elastic, deformable, resilient material has a double function, meaning a first function during shaping of the shell and a second function during removal of the solid shell from the mould.

It is especially preferred to reverse the mould in its portion being made of an elastic, resilient material by a dislocating element in an upward direction, the dislocating element contacting the mould at the side of the mould facing away from the mass.

The dislocating element serves to at least partly deform the mould in an upward direction, or in other words to at least reverse portions of the mould in an upward direction.

The desired movement will be finished when the mass in its fluidized condition has reached the rim portion of the shell, and when it has reached its solid condition at this place. The rim portion of the shell to be formed does not necessarily have to be the rim portion of the mould. In many cases, the mould is located adjacent to a majority of moulds all being designed as impressions being located in a plate-like body. The moulds are connected to a horizontal plate. Consequently, only the impressions being formed by the moulds have to have the elastic, deformable design. The plate-like body may be designed as a stiff body.

The backstroke of the dislocating element initiates the restoring process of the mould to reach its initial position. The backstroke is conducted in a way that the dislocating effect of the fluidized mass is cancelled, and the mould reaches its initial shape. This process is coordinated with the hardening portions of the shell.

It may be of special importance to the novel reversing method to use a cold gas, especially cold air, such that it contacts the side of the mould facing away from the mass. Blowing the cold gas onto the mould serves to cool the mass and to locally solidify the mass. The blowing process may take place in a clocked manner only at certain method steps, or also during the entire shaping process of the shell. It also serves to minimize the increased amount of mass in the bottom portion of the mould.

The mould is of special importance to the present invention. The mould is a cup-like impression or opening. It is made of an elastic material having sufficient resilient properties. The wall thickness of the mould is at least partially designed such that it may be deformed and reversed, respectively, to shape the shell. The mould is only partly filled with the mass. First of all, the mass is distributed in the mould to form a horizontal liquid level. This initial distributing process my be positively influenced or accelerated by a vibrational process and a shaking process, respectively, especially when pasty or honey-like flowing masses are to be processed to form the shell. An especially preferred material for the mould is silicone. However, it is also possible to use other elastic plastic materials or other elastic resilient materials. The novel mould cooperates with a novel dislocating element being located at the side of the mould facing away from the mass and below the mould to contact the mould during the deformation process and the reversing process, respectively. The dislocating element never contacts the mass. It may have various designs. For example, it may be designed as a mechanically driven stamp element, a inflatable cushion, a piston rod of a piston/cylinder unit or a toothed rod being movable by an electric motor. The dislocating element is located below the mould and to be vertically movable with respect to the mould. The dislocating element is effective from below towards an upward direction, and it deforms the mould together with the mass contained in the mould.

In an especially simple and preferred exemplary embodiment of the novel apparatus, the dislocating element may be designed as a mechanical stamp element reversing the elastic portion of the mould in an upward direction during its upwardly directed stroke, and allowing for the mould regaining its initial position during a downwardly directed backstroke. It is possible to cool the mould and/or the dislocating element and the stamp element, respectively. When the dislocating element is designed as a mechanical stamp element, the stamp element may also be connected to a cooling circuit. Usually, it is sufficient to blow cool air onto the mould from below to cool the mass.

The dislocating element is located to a drive for moving the dislocating element, the drive being designed and arranged to be controlled with respect to the continuing solidifying process of the mass forming the shell. The drive is associated with a control unit determining the upwardly directed forward stroke and the downwardly directed backward stroke of the dislocating element. The stroke movement does not have to be uniform. It may be realized in different sections at different velocities to take the solidifying properties of the mass in the mould into account. It also makes sense when the dislocating element at the upper dead center of its movement remains for a certain period of time until solidifying of the mass begins in the rim portion of the mould. This period of time during which the dislocating element does not move may be in a range of approximately between 1 to 30 seconds.

To minimize the increased amount of the mass in the bottom portion of the shell, a unit for blowing in cold gas during and/or after the mould reaching its initial position may be located above the mould. The gas may for example be cold air, nitrogen or the like. The cold gas does not only serve to cool the mass. In the case of especially flowable masses, the gas may also be used for contactless shaping, especially in the bottom portion of the mould and of the shell, respectively. It is especially preferred when at least the elastically deformable portion of the mould has thin walls, and when the mould is supported by an annular supporting body at the side of the mould facing away from the mass. The supporting body supports portions of the thin wall of the elastically deformable mould. The supporting body makes it possible to design the mould to have especially thin walls, and to design the mould to be a membrane-like element within a mould not being made of a deformable, but instead of a stiff material, for example of metal. It is only of importance to the reversing process that this part of the mould is deformable to allow for contactless displacement of the fluidized mass being contained in the mould and in this part of the mould, respectively, with the dislocating element. Usually, the supporting body is made of metal, and it has a central opening. It may fulfill a centering function for the dislocating element being designed as a stamp such that it is ensured that the dislocating element engages the mould in the vertical axis of the mould and such that the mass is dislocated to all sides in a uniform way. At the same time, the supporting body is a simple possibility for cooling the mould. The supporting body may have a hollow design, and it may be connected to a cooling circuit such that a cooling medium flows through the hollow supporting body.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

FIGS. 1–13 are schematic illustrations. They are illustrated as cross-sectional views only for reasons of making it easier to understand the construction of the novel apparatus and the function of the novel method. They only show one single mould. It is to be understood that one usually uses plates including a majority of such moulds, the moulds being located in the plate one next to the other in a uniform pattern.

Figure 1:
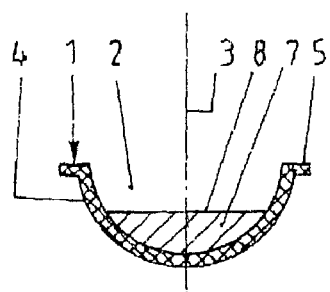
FIG. 1 is a schematic view of a cross section of one novel mould after filling in the fluidized mass.

Referring now in greater detail to the drawings, FIG. 1 illustrates a novel mould 1. The mould 1 includes a cup-like impression 2 being designed to be opened in an upward direction. The mould 1 with its impression 2 may be designed to be rotationally symmetric with respect to a vertical axis 3. The mould 1 is illustrated as a single mould although it usually is located next to a majority of identical moulds in a uniform pattern to be capable of producing a plurality of shells and of shell-like hollow bodies, respectively. The mould 1 at least in the portion of the cup-like impression 2 is made of an elastic plastic material. The cup-like wall 4 may be connected to a plate 5 being more or less designed as a stiff body. The plate 5 is only partly illustrated. However, it is to be understood that a majority of the moulds 1 is located in the plate 5.

Figure 5:
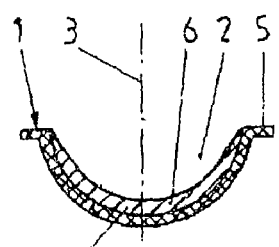
FIG. 5 is a view of the mass being located in the mould and solidifying to form a shell.

A fluidized mass 7 (FIG. 1) is poured into the mould 1 from above to produce a shell 6 (FIG. 5). The fluidized mass 7 partly fills the impression 2 of the mould 1. The amount of the mass 7 is coordinated with the size and the wall thickness of the shell 6 to be produced. The mass 7 may for example be a caramel mass, a fondant mass, a fruit mass, a jelly mass, a chocolate mass, a candy mass, a hard sugar mass or a different partly fluid, pasty or honey-like flowing mass. The mass 7 in its fluidized condition reaches the impression 2 of the mould 1, and it initially reaches the impression 2 until the mass 7 has been distributed in the impression 2 to form a horizontal liquid level 8 in the mould 1. Distribution may be increased or accelerated by vibrational measures or by shaking measures. However, usually this is not required. The temperature of the mass 7 is of importance. The mass 7 is introduced into the impression 2 of the mould 1 at a predetermined temperature above the solidifying temperature of the mass 7.

Figure 2:
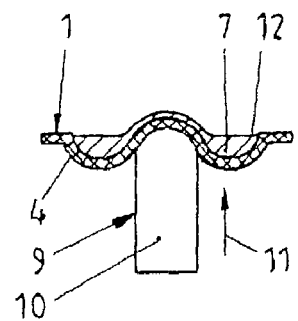
FIG. 2 is a view of the mould according to FIG. 1 after lifting the dislocating element.
Figure 3:
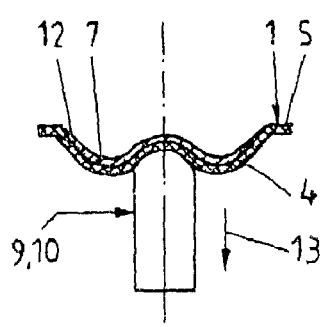
FIG. 3 is a view of the relative position of the elements after partly lowering the dislocating element.

As it is to be seen from FIG. 2, a dislocating element 9 is located below the mould 1, meaning at the side of the mould 1 facing away from the mass 7. The dislocating element 9 in its simplest form may be designed as a mechanical stamp element 10. The dislocating element 9 has a radius being substantially less than the radius of the impression 2. It may be designed to be rounded in its upper portion, as this is illustrated. However, it may also include an impression in this portion. The dislocating element 9 in its starting position is located below the mould 1 such that the mould 1 has its initial shape without any influences by the dislocating element 9. For this purpose, the mould 1 is at least partially made of a material having respective resilient properties allowing for the mould 1 reaching its initial starting position when there is no contact to the dislocating element 9.

The dislocating element 9 is lifted with respect to the mould 1 in the direction of arrow 11 in a way controlled with respect to time and the path such that it deforms and dislocates, respectively, the mould 1 together with the mass 7 contained in the mould 1. The upward stroke of the dislocating element 9 according to arrow 11 is ended in the upper dead center. The dislocating element 9 may remain in this position for a certain period of time being sufficient to allow for the fluidized mass 7 in the portion of a rim 12 of the shell 6 to be formed to solidify, and to stick to the wall 4 of the mould 1. The remaining mass 7 still has its fluidized condition.

The dislocating element 9 is then moved in a downward direction according to arrow 13 in a way coordinated with the solidifying process of the fluidized mass 7 which takes place from above in a downward direction. In this way, the shell 6 being made of the mass 7 solidifies, further portions of the shell 6 hardening after the rim of the shell 6. The lowering process of the dislocating element 9 according to arrow 13 may take place in a continuous way or in a step-like way, also at changing velocities, and coordinated with a kind of the properties of the mass 7 as well as with the shape of the mould 1. Finally, there is a condition as illustrated in FIG. 5. The entire mass 7 has solidified to form the solid shell 6. The mould 1 due to its resilient properties has reached its initial position, as illustrated in FIG. 1, and by removing the dislocating element 9 from contact to the mould 1. It is to be understood that the dislocating element 9 during its upward movement according to arrow 11 (FIG. 2) as well as during its downward movement according to arrow 13 (FIG. 3) is moved in a way centric with respect to the axis 3.

Especially in the case of the shell 6 having a semicircular, cup-like design requiring a respective design of the mould 1 with its impression 2, there will be a certain increased amount of mass material in the portion of the bottom of the mould 1 and of the impression 2, respectively, depending on the kind of the mass 7 which is used. Usually, the shell 6 will have an increased wall thickness in the region of the bottom 14 than it is the case in the region of the rim 12. To counteract this increased mass amount in the region of the bottom 14 and to realize approximately uniform wall thickness of the shell 6, the mould 1 may be associated with a unit 15 for blowing in a cold gas distributing in the impression 2 of the mould 1 according to arrows 16. The cold gas may be cold air or any other inert gas, for example nitrogen in the gaseous condition. The additional blowing step of cold gas may be realized in a clocked manner to be used only during short periods of time, for example directly after having reached the initial position of the mould 1 after its regaining movement. At this point in time, the mass portions at the bottom 14 are still liquid or at least partially liquid. These mass portions may be cooled by the stream of gas being directed in a downward direction, and they also may be dislocated in the mould 1 to minimize the increased amount of mass in the region of the bottom 14. Consequently, wall thickness of the shell 6 along the height of the shell 6 is more uniform. However, additionally cooling and dislocating in the mass 7 is only necessary for some masses. It is also possible to cool the mould 1 alternatively or in addition, for example by a stream of cool gas coming from below, as it is indicated in FIG. 1 by arrows 17 and 18. The mould 1 may also be cooled in different ways to have a positive influence or to control the solidifying process of the mass 7 to form the solid shell 6.

Figure 6:
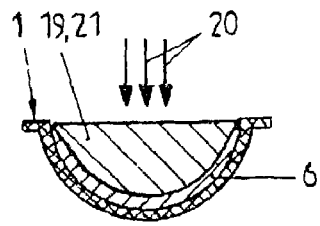
FIG. 6 is a view of the mould including the shell and an additional mass.

After the solidifying process of the shell 6 has been completely finished according to FIG. 5, a second mass 19, for example a nougat mass, may be poured into the hollow space 21 of the shell 6 according to arrow 20, as this is illustrated in FIG. 6. The hardening process of the shell 6 may also be controlled by moving the mould 1 with the shell 6 through a section of a cooling channel.

Figure 4:
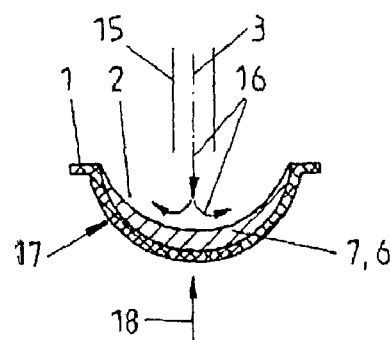
FIG. 4 is a view during the solidifying process of the mass in the bottom portion.
Figure 7:
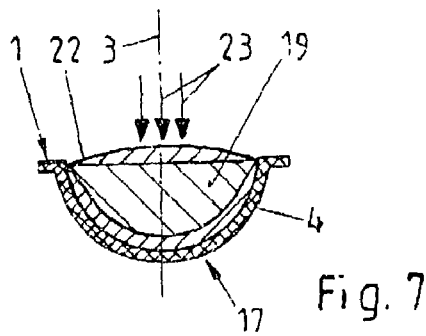
FIG. 7 is a cross-sectional view of the mould after a covering process.

FIG. 7 illustrates another possible step during manufacture of an edible product. This step is the application of a cover 22. Such a cover mass is poured onto the product according to arrows 23. During this additional producing step of a finished product, a stream of cooled air may be directed onto the mould 1 from below according to arrow 17 (FIG. 7). However, it is also possible to cool with cool gas after placing the cover mass on the shell 6, as this is illustrated in FIG. 4 with respect to the mass 7 forming the shell 6. Finally, the masses 7 and 19 and the cover 22 will harden such that the product may be removed from the mould 1.

Figure 8:
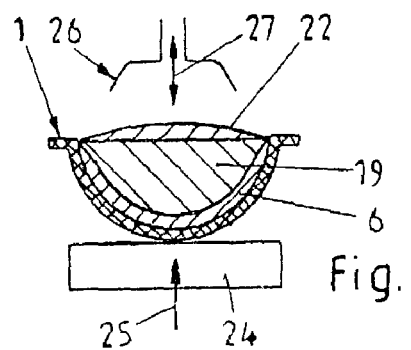
FIG. 8 is a cross-sectional view directly before removing the product from the mould.

FIG. 8 illustrates an ejector element 24 which may be designed as a stiff body. The ejector element 24 is controlled to be moved in an upward direction according to arrow 25. The elastic material of the mould 1 has a positive effect on the removal of the shell 6 from the mould 1. The finished product may be easily removed from the mould 1 even in the case of masses 7 which are difficult to be processed, especially sugar masses. It is to be understood that it is also possible to remove shells 6 which are empty from the mould 1 in the same way as this has been described with respect to FIG. 8. It is possible to arrange a suction element 26 above the mould 1, the suction element 26 being moved according to double arrow 27 and transporting the shell 6.

Figure 9:
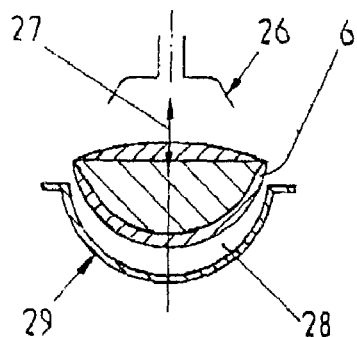
FIG. 9 is a schematic view of the product before placing it in a packing material.

Then, as this is indicated in FIG. 9, the product may be moved in a downward direction to reach an impression 28 of a packing material 29 by the suction element 26. It is to be understood that the suction element 26 is connected to a vacuum source (not illustrated), and that it is respectively controlled.

Figure 10:
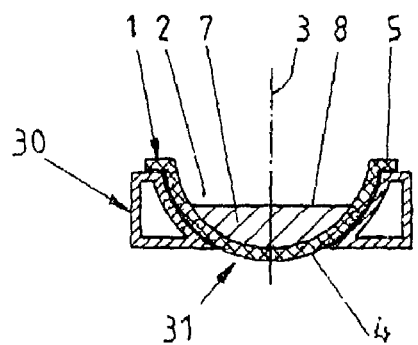
FIG. 10 is a similar view as FIG. 1, but illustrating a different exemplary embodiment.

FIG. 10 illustrates another exemplary embodiment of the novel mould 1. It is referred to the above description. The mould 1 according to FIG. 10 includes a supporting ring 30 as an additional component. The supporting ring 30 may be made of a material with good heat conductivity properties, and it may be connected to a tempering circuit to have an influence on the temperature of the mould 1 in its contact portions to the supporting ring 30. However, this does not have to be a cooling circuit, it is also possible to temper the wall 4 of the mould 1 in the desired way and during certain periods of time to achieve exact control of the solidifying process of the mass 7 to the shell 6. The supporting ring 30 usually is designed as an annular body. It includes an opening 31 being located centrically with respect to the axis 3. The opening 31 may be used as a centering guiding element for the dislocating element 9 and for the stamp element 10, respectively, as this is to be seen from FIG. 11. It is also possible to design the supporting ring 30 as a closed body and to be movable such that it only contacts the wall 4 of the mould 1 at times during which the dislocating element 9 does not contact the wall 4.

Figure 11:
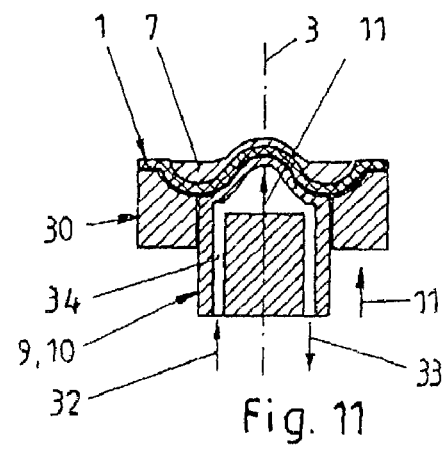
FIG. 11 is a similar view as FIG. 2, but illustrating a different exemplary embodiment of the novel mould and a dislocating element being connected to a cooling circuit.

FIG. 11 illustrates another exemplary embodiment of the novel apparatus. The dislocating element 9 and the stamp element 10, respectively, is cool. It is connected to a cooling circuit being indicated by arrows 32, 33. For this purpose, the stamp element 10 includes a channel 34. FIG. 11 also shows that the surface of the stamp element 10 being directed in an upward direction may also have a different design than it is illustrated in FIG. 2. In this way, there even is a greater effect on deformation and reversing of the mould 1 with its wall 4 in an upward direction.

Figure 12:
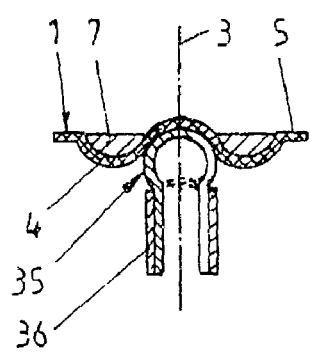
FIG. 12 is a schematic view of another exemplary embodiment of the novel dislocating element.

FIG. 12 illustrates another exemplary embodiment of the novel apparatus in a schematic view. It illustrates an intermediate position being similar to the one in FIG. 3, but showing a mass having different flowing properties. An inflatable balloon 35 is used as the dislocating element 9, the balloon 35 being arranged in a stationary tube 36. Its starting position is illustrated by a broken line. Inflating of the balloon 36 results in the wall 4 of the mould 1 being reversed in an upward direction in a centric way with respect to the axis 3.

Figure 13:
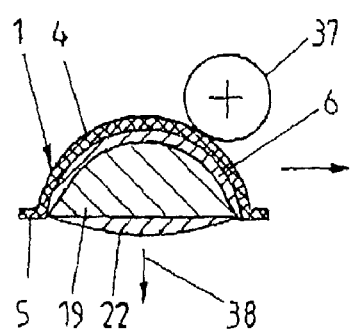
FIG. 13 is a schematic view during removal of the finished product from the mould.

FIG. 13 illustrates another exemplary embodiment of the apparatus for producing shells 6 or other products. In contrast to the illustration of FIG. 8 in which the product is lifted in an upward direction, FIG. 13 illustrates the mould 1 in a turned position as it is known from knocking melted chocolate articles out of the mould 1. The mould 1 with the shell 6 or the product contained therein is moved with respect to a roller 37. The elastic design of the mould 1 has a positive effect on the step of removing the product from the mould 1. The product falls out of the mould 1 according to arrow 38. The product may be placed on a conveyor belt or the like. It is to be understood that it is possible to use a different element instead of the roller 37, for example a rod being designed and arranged being movable in a vertical direction.

Many variations and modifications may be made to the preferred embodiments of the invention without departing substantially from the spirit and principles of the invention. All such modifications and variations are intended to be included herein within the scope of the present invention, as defined by the following claims.

I claim:

1. An apparatus for producing a shell of an edible mass, comprising:
    at least one mould at least being partly made of an elastic and resilient material, said mould including an inner side, an outer side, a top portion and a bottom portion, said inner side being designed and arranged to be contacted by the mass when the mass has been filled into said mould; and
    at least one dislocating element being designed and arranged to contact said outer side without directly contacting the mass, said dislocating element being designed and arranged to temporarily deform said mould in an elastic way such that said bottom portion of said mould is located above said top portion of said mould.

2. The apparatus of claim 1, wherein said dislocating element is arranged below said mould, said dislocating element being designed and arranged to be movable in a vertical direction with respect to said mould.

3. The apparatus of claim 2, wherein said dislocating element is designed as a mechanical stamp element, said mechanical stamp element being designed and arranged to deform the elastic material of said mould in an upward direction during an upwardly directed first stroke, and to allow for said mould to reach its initial shape during a downwardly directed second stroke.

4. The apparatus of claim 1, wherein the shell includes a bottom portion, further comprising a unit being located above said mould, said unit being designed and arranged to blow a cold gas onto the mass to minimize an amount of mass being located in the bottom portion of the shell.

5. The apparatus of claim 1, wherein said mould includes elastically deformable walls.

6. The apparatus of claim 5, further comprising an annular supporting body being designed and arranged to support said outer side of said mould.

7. An apparatus for producing a shell of an edible mass, comprising:
   at least one mould being designed and arranged to be at least partly filled with a fluidized edible mass, said mould including an inner side, an outer side, a top portion and a bottom portion in an initial position, said inner side being designed and arranged to be contacted by the mass when the mass has been filled into said mould, said mould at least being partly made of an elastic and resilient material;
   at least one dislocating element being designed and arranged to contact said outer side without directly contacting the mass, said dislocating element being designed and arranged to temporarily and elastically deform said mould in an upward direction until said bottom portion of said mould is located above said top portion of said mould, the mass being dislocated in said mould without being directly contacted by said dislocating element, said dislocating element being designed and arranged to be removed from contact to said mould such that said mould reaches its initial position due to its elastic and resilient material and such that the shell attains a hollow shape.

8. The apparatus of claim 7, wherein the shell includes a bottom portion, further comprising a unit being located above said mould, said unit being designed and arranged to blow a cold gas onto the mass to minimize an amount of mass being located in the bottom portion of the shell.

9. The apparatus of claim 8, wherein said mould includes elastically deformable walls.

10. The apparatus of claim 9, further comprising an annular supporting body being designed and arranged to support said outer side of said mould.

11. An apparatus for producing a shell of an edible mass, comprising:
    means for forming a mould that is at least partly made of an elastic and resilient material, said mould including an inner side, an outer side, a top portion, and a bottom portion, said inner side being designed and arranged to be contacted by the mass when the mass has been filled into said mould;
    means for contacting said outer side without directly contacting the mass via a dislocating element;
    means for deforming temporarily said mould such that said bottom portion of said mould is located above the top portion of the mould.

12. The apparatus of claim 11, further comprising means for arranging said dislocating element below said mould; and means for moving said dislocating element in a vertical direction with respect to said mould.

13. The apparatus of claim 12, wherein said dislocating element is designed as a mechanical stamp element, said mechanical stamp element being designed and arranged to deform the elastic material of said mould in an upward direction during an upwardly directed first stroke, and to allow for said mould to reach its initial shape during a downwardly directed second stroke.

14. The apparatus of claim 11, further comprising means for moving said dislocating element in a coordinated way with respect to a continuing solidifying process of the mass forming the shell.

15. The apparatus of claim 11, further comprising means for blowing cold gas onto the mass to minimize an amount of mass being located in the bottom portion of the mould.

16. The apparatus of claim 15, further comprising means for blowing the cold gas onto the mass when said mould due to its resilient properties moves to reach its initial position.

* * * * *